(12) United States Patent
Pickering

(10) Patent No.: US 6,944,592 B1
(45) Date of Patent: Sep. 13, 2005

(54) INTERACTIVE VOICE RESPONSE SYSTEM

(75) Inventor: John Brian Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 09/670,046

(22) Filed: Sep. 25, 2000

(30) Foreign Application Priority Data

Nov. 5, 1999 (GB) .................................... 9926134

(51) Int. Cl.[7] .......................................... G10L 15/22
(52) U.S. Cl. ....................................... 704/251; 704/275
(58) Field of Search ............................... 704/231, 235, 704/251, 254, 257, 270, 275; 379/88.01, 379/88.04, 88.16

(56) References Cited

U.S. PATENT DOCUMENTS

| | | | | |
|---|---|---|---|---|
| 5,503,560 A | * | 4/1996 | Stentiford | 434/167 |
| 5,666,400 A | * | 9/1997 | McAllister et al. | 379/88.01 |
| 6,560,576 B1 | * | 5/2003 | Cohen et al. | 704/270 |
| 6,665,644 B1 | * | 12/2003 | Kanevsky et al. | 704/275 |
| 6,721,416 B1 | * | 4/2004 | Farrell | 379/265.07 |
| 6,748,361 B1 | * | 6/2004 | Comerford et al. | 704/275 |
| 6,826,529 B1 | * | 11/2004 | Zhang et al. | 704/251 |
| 6,853,971 B2 | * | 2/2005 | Taylor | 704/10 |
| 6,859,776 B1 | * | 2/2005 | Cohen et al. | 704/270 |
| 6,873,951 B1 | * | 3/2005 | Lin et al. | 704/251 |

* cited by examiner

Primary Examiner—Martin Lerner
(74) Attorney, Agent, or Firm—Kelly K. Kordzik; Winstead Sechrest & Minick P.C.

(57) ABSTRACT

An interactive voice response system which statistically analyses word usage in speech recognition results to select prompts for use in the interaction. A received voice signal is converted to text and calculating factors such as context and task word ratios and word rate. These factors are used to make dialogue decisions as to the whether to use expert, intermediate, or novice prompts depending on whether the factor falls below, inside or above a threshold range.

36 Claims, 6 Drawing Sheets

| Prompt database 34 | | | |
|---|---|---|---|
| Prompt no. | Expert | Intermediate | Novice |
| p1 | Source? | What is the source account? | What is the source account which you wish to transfer money from. |
| p2 | Destination? | What is the destination account? | What is the destination account which you wish to transfer money to. |
| p3 | Amount? | What is the transfer amount? | What is the amount of money which you wish to transfer? |
| p4 | Timing? | When is the transfer date? | What is the date on which you wish the money to transfer to the destination account? |

Figure 2

| Prompt script database 36 | Prompt scripts |
|---|---|
| Caller no | |
| Default caller | P(N,p1); P(N,p2); P(N,p3); P(N,p4) |
| Multiple prompts | P(I,p1+ p2), P(I,p3+p4) |
| Multiple reordered prompts | P(E,p2 + p1), P(E,p4 + p3) |
| caller CLI=01962 815000 | P(N,p1 + p2), P(I,p3), P( E,p4) |

Figure 3

| Word | context | task | function | phatic | extra-linguistic | para-linguistic | stylistic |
|------|---------|------|----------|--------|------------------|-----------------|-----------|
| I | | | | 1 | | | |
| want | | | 1 | 1 | | | |
| my | | | | 1 | | | |
| account | 1 | 1 | | | | | |
| balance | 1 | 1 | | | | | |
| which | | | 1 | 1 | | | |
| you | | | 1 | 1 | | | |
| say | | | 1 | 1 | | | |
| is | | | 1 | 1 | | | |
| over drawn | 1 | | 1 | 1 | | | |
| should | | | | 1 | 1 | | 1 |
| like | | | | | 1 | | 1 |
| bank | 1 | | 1 | | | | |
| please | | | | | | | 1 |
| er | | | | | | | |
| um | | | | | | 1 | |
| oh | | | | | | | |

Figure 6

INTERACTIVE VOICE RESPONSE SYSTEM

TECHNICAL FIELD

This invention relates in general to an interactive voice response system using speech recognition as input, and in particular, to a method of dialogue management in the interaction using the statistical distribution of the type of words used by a caller interacting with the system, wherein the management system makes decisions regarding the prompt selection and call flow of the dialogue.

BACKGROUND INFORMATION

An interactive voice response (IVR) system is a computer system that can be integrated with a telephone system that allows a caller to dial into the computer system over a telephone line and access a service running on the computer. The caller may then interact with and receive voice information from the service. Typically, the interactive service has a range of services for the caller to choose from and presents options at a prompt menu expecting the caller to select one. After the service option has been chosen, further information is required from the caller and input to the IVR. The service gathers relevant information, processes the information to get a result and from the result creates a prompt for delivery to the caller.

The interaction between the users and the system comprises various voice prompts output by the system and responses thereto input, via the telephone keypad, by the user. Voice response systems are used by service providers, such as banks, to automate fully or partially telephone call answering or responding to queries. Typically, a voice response system provides the capability to play voice prompts comprising recorded voice segments or speech synthesized from text and to receive responses thereto. The prompts are generally played as part of a voice menu invoked by the call flow logic. A state table can access and play a voice segment or synthesize speech from given text. The prompts are usually part of a voice application which is designed to, for example, allow a customer to query information associated with their various banks accounts.

As the users of such system may not be familiar with the use thereof, it is necessary to ensure that the instructions or voice prompts are sufficiently comprehensive to allow a novice user to successfully interact with the system. However, the more competent the IVR user, the more they begin to anticipate the various voice prompts and it becomes increasingly tedious for them to have to listen to such comprehensive instructions when more succinct instructions would suffice. "Expert" or fastpath methods are often provided, usually on explicit user selection. These allow the caller to enter multiple pieces of information at one time, and to hear shorter and more succinct prompts.

European patent publication 0697780 discloses a system for varying the voice menus and segments presented to the user of a voice response system according to the competence of the user. The response time of a user to voice prompts is measured, and an average response time is determined. It is assumed that the lower the average response time, the greater the competence of the user. The average response time is used as an index to a table of ranges of response times. Each range has respective voice segments associated therewith. The voice segments comprise oral instructions or queries for the user and vary according to the anticipated competence of the user. If the average response time changes such that the voice segments indexed are different to the current voice segments, then a database containing information relating to user competence is updated to reflect such a change. Accordingly, when the user next interacts with the voice response system, a new set of voice segments more appropriate to the user's competence will be played.

Using response times as a gauge of caller competence is only a first approximation and can be incorrect. The above publication concentrates on dual tone multi-frequency (DTMF) input to the IVR which is accurate but limited to a sometimes tedious closed menu structure and set sequences. A more flexible but less accurate approach to caller interaction uses speech converted into text as input to a service. For instance, instead of presenting the caller with an audible menu, the caller can be asked a more open question as to the nature of his business. An automatic speech recognition component (ASR) translates the speech into text, and the IVR interprets the text in the light of the services offered. Response times have only limited effectiveness as an estimate of the competence of the caller in such circumstances. Thus, there is a need in the art to provide an improved method of estimating the competence of a user for a speech recognition IVR system.

With the advent of advanced language processing techniques, such as Natural Language Understanding and Dialogue Management, the potential for both the "expert," and less-experienced users to benefit from fastpaths and task switching are increasing. However, there are two crucial factors which cannot be catered for easily. First, it is necessary to introduce an explicit method such as menu selection, or even Caller Line Identification, to switch between expert and novice versions of a service. Second, this selection is made on a service-wide basis, and does not change either without redialling or returning to a point in the service where the selection may be made. Caller Line Identification (CLID) (or Automatic Number Identification (ANI) in the United States) can be used to retrieve caller records in which is stored the caller's preference of export or notice prompt. When given the choice, many callers will wrongly identify themselves as "expert" and discover that the service is not responding well because the service has changed or because of environmental factors. There is a common assumption that experts will automatically use or want to use barge-in, and the novice not. But again, for environmental reasons, each group is better served by flexibility.

The selection of expert or novice prompts, however, is not a generically applicable distinction, which the caller themselves can necessarily judge. In some circumstances (background or channel noise), the caller would be better served as a novice. Competence may change within the same application, which increases the problem of how to define "expert." Expertise might be regarded as some level of competence in achieving a given task in the most efficient manner.

SUMMARY OF INVENTION

In one aspect of the present invention there is provided a method of managing dialogue in an interactive voice response system comprising the steps of receiving a voice signal from a caller to the IVR, converting the voice signal to text, estimating a caller type based on the number of words of a particular type within the text, and using this factor to make dialogue decisions.

Therefore when a caller instigates an interaction with the voice system and voices a response, the IVR takes this response and undertakes a statistical analysis of words of a certain type. The analysis is used as a basis for making decisions on the flow and structure of the dialogue with the caller.

In one embodiment, a decision on which prompt to present next to the caller is made depending on the factor, and in particular, a decision whether to use "expert" or "novice" prompts is made depending on whether the factor is above or below a threshold value. The expert may be viewed not necessarily as someone who has used a service many times and remembers what the answer to the next prompts will be, but rather a person who effectively gets what they want on a single pass from the automatic service: the expert is the user who, regardless of background or channel interference, most effectively achieves what they set out to do. More advantageously, a decision whether to use expert, intermediate, or novice prompts is made depending on whether the factor falls below, inside or above a threshold range.

An important and useful factor is a ratio of words relevant to the context of the dialogue, which gives a measure of the communicative efficiency of the incoming speech. For instance, an expert caller would know and use more relevant words in a dialogue than a novice who had yet to learn what words were the most relevant. It is a factor derived from the ratio of lexically marked and unmarked items and gives a first approximation of the competence of the caller. Another factor is the number of words per second spoken by the caller which gives an indication of the "regularity" of delivery (the prosodic fluency). For instance, an expert caller would be confident and regular in delivery of speech whereas a novice would be somewhat hesitant. The word rate factor may be used alone or more advantageously is used together with the context ratio to give a further approximation as to the competence of the caller. Ideally, the context ratio and the word rate factors are weighted and combined to give an overall factor having a threshold value or range to decide the level of competence of the caller.

Another factor is a ratio of the words relevant to the particular task or service which is part of the dialogue. This gives an indication of the task effectiveness of the incoming speech. The task words are a subset of the context words which are appropriate to the current task. It is important, therefore, that the IVR is aware of an individual task within the dialogue and what group of task words corresponds to the tasks. The IVR application services correspond with the groups of task words. Advantageously, the context ratio, word rate factor, and service ratio are weighted and combined to give an overall factor having a corresponding threshold value or range.

Another factor is a ratio of extra linguistic items in the text such as 'er', 'um' and unrecognized items. The context ratio, word rate factor, service ratio, and extra linguistic items are weighted and combined to give an overall factor. Extra linguistic terms are irrelevant to LEXICAL meaning.

The context ratio, word rate factor, service ratio, and extra linguistic items are weighted and combined to give an overall factor.

Another factor is a ratio of stylistic items in the text such as 'should', like', and 'gimme'.

Combining all the factors together would indicate whether or not the caller is an "expert" and therefore whether or not the application structure and the outgoing prompts could be modified to ensure caller satisfaction and the efficient running of the service tailored to the caller's needs. Further, a running average is maintained throughout a call: moment-to-moment excursions from this could indicate difficulties which should be addressed; further, variance would be used to indicate chance expert interactions which might be ignored in the automatic decision as to whether or not the caller is an expert and therefore can be allowed to be left with little "intervention" from more excursive prompts.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

In order to promote a fuller understanding of this and other aspects of the present invention, an embodiment will now be described, by way of example only, with reference to the accompanying drawings in which:

FIG. 2 is an example prompt voice database;

FIG. 3 is an example prompt script database;

FIG. 6 is an example of a dictionary of a present embodiment.

DETAILED DESCRIPTION

Figure 1:
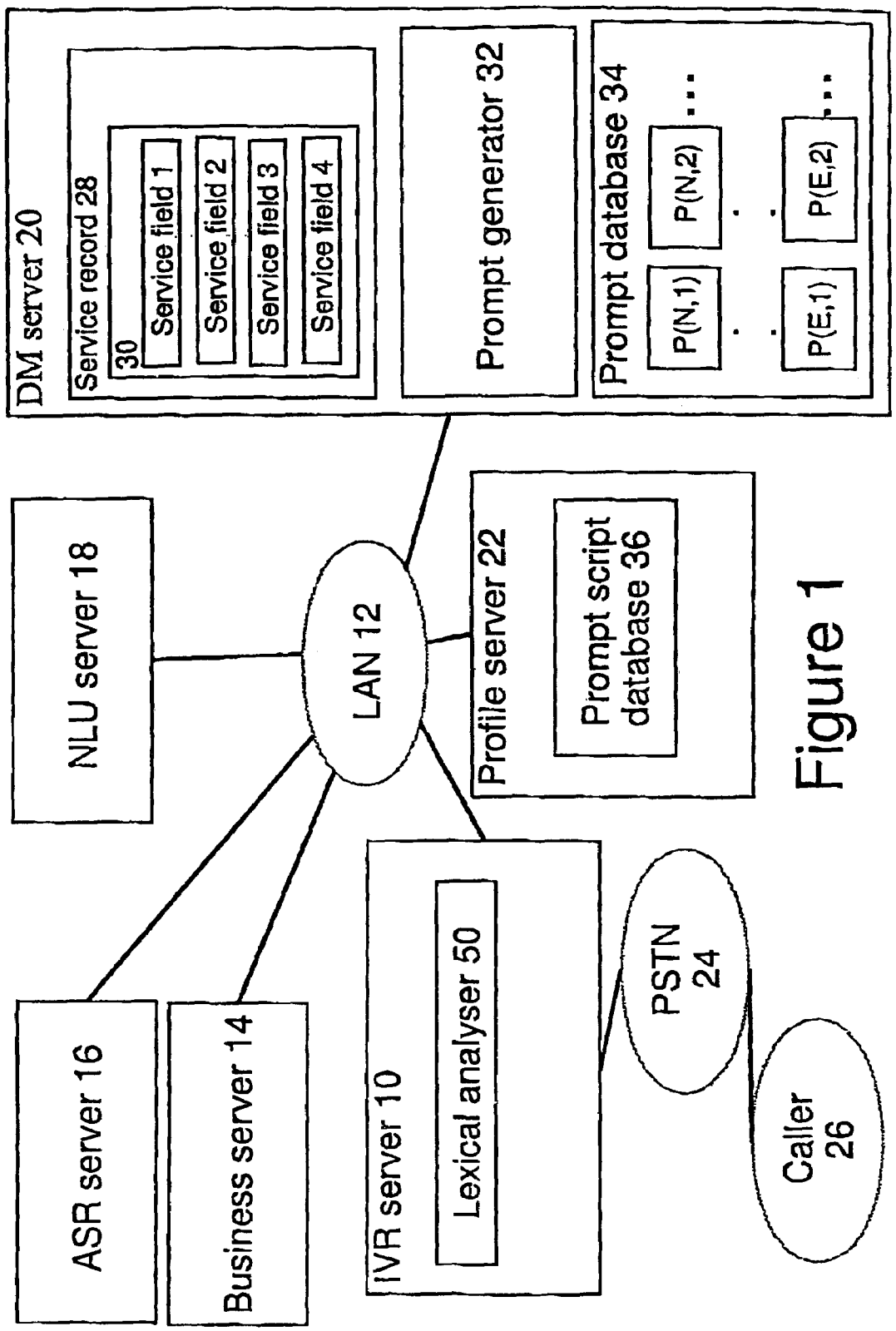
FIG. 1 is a schematic representation of an IVR system of a present embodiment.

In the following description, numerous specific details are set forth such as specific network configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is shown a schematic representation of an embodiment of the present invention. An interactive voice response system 10 including standard IVR capabilities is connected to a LAN (local area network) 12 to access server-based automated services to perform specialized tasks. A business server 14 is connected to the LAN 12 to perform the business function part of the service. An automatic speech recognition (ASR) server 16 is a speech to text engine and is connected to the LAN 12. A natural language unit (NLU) 18 interprets the converted text to extract relevant words as data items. A dialogue manager (DM) 20 connected to the LAN 12 provides prompts to the IVR 10. A profile server 22 provides caller profiles to the DM 20 for construction of personalized prompts. The IVR 10 also comprises a lexical analyzer 50 that estimates the communication efficiency of the caller interaction and uses this factor to choose a competence of the caller 26. Based on this, the IVR 10 selects a set of prompts to play to the caller 26.

The IVR 10 is connected to a telephone or Internet network (public switched telephone network (PSTN)) 24, which in this embodiment is a land line but which in other embodiments is a wireless telephony network or an IP telephony connection. A caller 26 accesses the IVR 10 via the telephone or Internet network 24. The IVR 10 provides voice messaging and audio text, whereby the caller 26 interacts with the automated service via option menus to decide what information is required and what service is needed. The IVR 10 normally provides several services, but in this embodiment one is described for simplicity. The IVR 10 runs the call flow through a dialogue in conjunction with the DM 20, which supplies the prompts. In this embodiment, the IVR 10 and DM 20 are described as separate servers but are closely related functions and may be implemented together in other embodiments. The IVR 10 provides the interface to the back-end services such as the business server 14. It provides explicit or implicit caller identification by calling line identification (CLID) or through explicit sub-dialogue with the caller 26. When a caller 26 requests a service, the IVR 10 opens a service record 28 containing service record fields 30 that require data. The IVR 10 collects pieces of information from the caller 26 or from a caller account (available from the business server 14) and fills the service record fields 30. Once complete, the service record 28 may be sent to the business server 14 to process the record and deliver an answer. An example of such a voice response system is the IBM Corepoint Voice Response for AIX product.

The business server 14 executes a business application that may process a service record containing information in fields. This is an end step of the embodiment and requires that all the information for a particular service has been acquired before it carries out its function. The business server 14 is arbitrary depending of the application of the IVR 10 and the embodiment is focused on collecting service information rather than processing the information. The ASR server 16 provides high function speaker-independent recognition capabilities including the following: dynamic grammar (or similar) loading and generation; dynamic application dictionary (or equivalent) loading; optionally, and if appropriate, modification of any stochastic language models; grammar and/or dictionary subsetting; large vocabulary; continuous speech input; and speaker independence. The ASR 16 functionality can be installed and running in the client device, in which case there needs to be a data exchange protocol between the client device and the "server", such that the client can upload relevant information to the server for tracking purposes. The ASR 16 also provides a length of sentence parameter and a hit-rate or confidence score parameter on the response.

The natural language understanding unit (NLU) 18 extracts the data information from a text response by tagging the meaning of the text. More than one piece of data may be identified in the response and it is the function of the NLU 18 to isolate and extract important data and pass them on to the dialogue manager (DM) 20.

The dialogue manager (DM) 20 comprises the service record 28 and associated service record fields 30; a prompt generator 32 and a prompt database 34 as further illustrated in FIG. 2. The DM 20 also has the facility to track: the words (lexical items) used by the caller 26; any associated synonyms; the path taken through the call flow by the caller 26; and the grammatical (syntactic) structure of caller input.

The prompt generator 32 takes a prompt script and generates a playable prompt in the form of a single voice data packet for the IVR 10. A prompt script is represented by the mnemonic code P(x,y) where 'x,y' represents the contents of the playable script and identifies one or more prompt parts in a prompt database array. For instance, P(N,p 1) is a playable prompt representing the novice prompt p1. The prompt generator 32 will acquire the voice data packet for novice prompt p1 and construct a playable prompt. When the contents of the script are a combination of prompt parts, the individual parts will be combined to make a playable prompt. For example, P(N,p1+p2) is a playable script representing a combination of the novice prompt parts p1 and p2. The prompt generator 32, on receiving this script, will fetch the individual prompt parts and combine them as required so that they play as one. For example, novice prompt part p1 "What is the source account?" and novice prompt part p2 "What is the destination account?" are combined with an "and" voice data packet to render the combined prompt of "What is the source account and what is the destination account?". In another embodiment, prerecorded combination prompts could totally or partially replace on the fly generation of combination prompts from individual prompts.

Referring to FIG. 3, the profile server 22 contains the caller profiles including the prompt scripts. Each profile contains key indicators, such as the IVR retry rate, IVR time out rate, vocabulary subsection, grammar subsection, and expected call flow route. Each profile is maintained and made available to the IVR service. The profile server 22 may also hold other caller or customer databases such as an account database that can be relationally linked to the caller prompt profiles.

The prompt database 34 comprises the voice data prompts used by the IVR 10 to interact with the caller 26 (see FIG. 2). A prompt is a voice recording relating to a specific IVR request and a service field 30 in a service record 28 has a corresponding prompt that is played to the user when the data item for the service field 30 is required. The prompts are stored and indexed for retrieval by the prompt generator 32 when it processes a prompt script. The prompts are categorized by caller competence so that for each type of request there are corresponding expert, intermediate and novice types of prompt. For instance, if the prompt generator 32 needs to play the first prompt in order to ascertain which is the caller's source account from which money is to be transferred, it could select from the expert prompt of "Source?", the intermediate prompt of "What is the source account?" and the novice prompt of "What is the source account that you wish to transfer money from?" (See FIG. 2). The criteria for whether the caller 26 is an expert, intermediate or novice can be stored in the caller profile. In this embodiment, there are four prompts, but in other embodiments there can be many services with varying numbers of prompts. In this embodiment, each prompt corresponds to a single request, for multiple requests the prompts need be combined in the prompt generator 32. In other embodiments, single prerecorded prompts may represent multiple requests without the need to combine them.

The prompt script database 36 comprises a script associated with a particular caller 26 and a service record 28 for a number of different types of callers and also individual callers (see FIG. 3). A new or unidentified caller 26 is given the novice default script of P(N,p1), P(N,p2), P(N,p3) and P(N,p4) without any combined or reordered prompts. Each playable prompt will be based on the original sequence of individual prompt parts. An example of a caller 26 using intermediate multiple prompts is P(N,p1+p2), P(N,p3+p4) whereby the prompt generator 32 will combine the intermediate p1 and p2 prompt parts as a single playable prompt voice data packet and then combine the intermediate p3 and p4 prompt parts as a single playable prompt voice data packet. An example of a caller 26 using multiple reordered prompts is P(E,p2+p1), P(E,p4+p3) whereby the prompt generator 32 will combine the expert prompt parts in a different order than previous mentioned. A caller 26 matched by calling line identification number (CLID=01962 815000) has mixed combined and individual prompts scripts P(p1+p2), P(p3), P(p4). The embodiment allows such a combination to be unique to that caller 26. In this embodiment, the caller 26 will have the actual script associated with his caller id, but in another embodiment, there may be an indirect association using a pointer to a common type of script.

Figure 4:
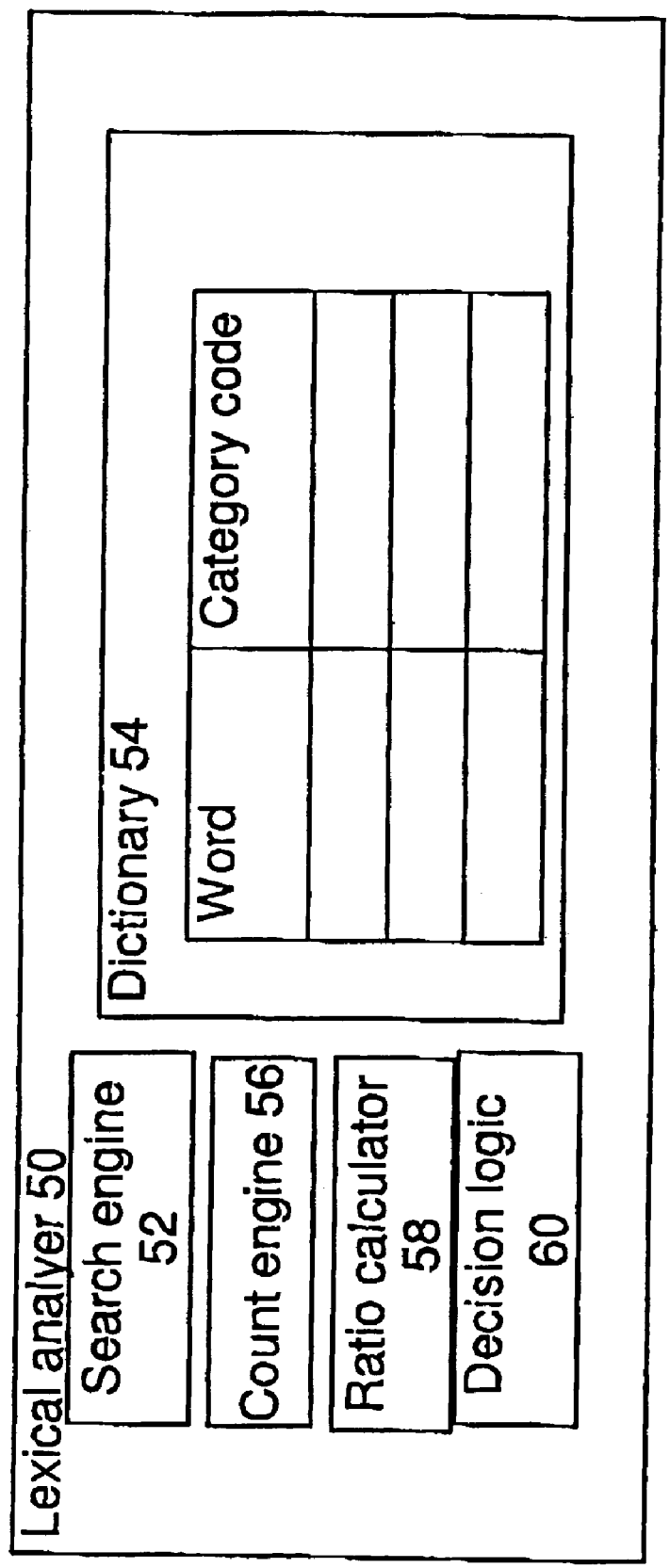
FIG. 4 is a schematic of a lexical analyzer.

Referring to FIG. 4, the lexical analyzer 50 comprises a search engine 52 for searching dictionary 54 against ASR text; a count engine 56 for counting the number of words in each lexical category; a ratio calculator 58 for determining the ratio of the lexical types; and decision logic for determining the competence of the caller 26.

Dictionary 54 is a lookup table with two fields: word and corresponding category code. The category code determines in which lexical categories the word belongs using binary indicators in sixteen or more bit number. The lexical categories are: content words; task words; function words; extra linguistic words; paralinguistic words and stylistic words. Content words are words which carry lexical meaning ("account", "transfer", and so forth, particular to the business application, and words such as "tree", "telephone", etc.). Task words are those specific to a particular service, and a subset of all content words. For instance, in a banking application: 'bank balance'; 'transfer'; 'statement'; 'account'; 'operator'; 'overdraft'; 'date'; 'percent'; 'pounds'; 'dollars'. In a banking application with several services, there will be a corresponding number of task word subsets of content words for making a transfer between accounts; ordering a statement; or checking a balance etc. Function words are words which are not content words but add to the grammatical correctness of the phrase, for example, 'of', 'the', 'and', 'a', 'when', 'how', 'is', 'was' and other auxiliary words, articles and conjunctions. Phatic words add no specific lexical or grammatical information, but affect the perception of the sentence (such as "oh"). Stylistic words include words like "should" and "gimme". In this embodiment, five distinct categories and one task category are used but more distinct and more task categories may be used, with a corresponding increase in the size of the category code. FIG. 6 is an example dictionary with word types indicated.

Referring again to FIG. 4, search engine 52 is for extracting a word from the ASR text and querying the dictionary for the category code which it passes on to the count engine 56.

Count engine 56 is for counting the number of words in the ASR text belonging to each category. It comprises a counter for each distinct lexical category and each separate task category: a content word counter; a task counter; a function word counter; an extra linguistic word counter; a paralinguistic word counter; and a stylistic word counter. It also comprises a total word counter. Each bit of the category code is checked and the corresponding counter is incremented if set. After the ASR text has been analyzed the counters contain the final result.

Ratio calculator 58 takes the results of the count engine 56 and works out a structure ratio; a service ratio; an extra linguistic ratio; a paralinguistic ratio; and a style ratio. The structure ratio is the ratio of content words to function words. The service ratio is the number of phatic words in the text divided by the task words for the service that the IVR 10 is using at that time. The ratio calculator queries the IVR 10 as to the particular service and chooses the correct task counter accordingly. The extra linguistic ratio is the number of extra linguistic words in the ASR text to the total number. The paralinguistic ratio is the number of paralinguistic words divided by the total number of words. The stylistic ratio is the number of stylistic words divided by the number of the total number of words.

Decision logic takes its input from the ratio calculator 58 to decide the level of competence of the caller 26. For example, in one embodiment, the decision logic uses the structure ratio only; if the ratio is 20% or below then the caller 26 is deemed unfocused in his use of the correct type of words (content words), and is given novice status; if the ratio is above 20% then the caller 26 is deemed competent in the use of content words and given expert status. In an enhancement to the first embodiment, an intermediate level of competence is defined for above 15% and below 31% with novice and expert level either side of this range. In a further enhancement, the decision logic uses the service ratio only; if the ratio is 70% or below the caller 26 is deemed a novice; if above 70% then the caller 26 is deemed an expert. An intermediate level is defined between 65% and 76% exclusive, with novice and expert levels either side of this ratio. Similar embodiments may make use of the extra linguistic ratio, paralinguistic ratio, and stylistic ratio on their own to decide between expert, intermediate and novice. A further embodiment uses a ratio matrix of the structure ratio and service ratio and multiples them by a weighting matrix to get an overall factor for which there is a threshold novice/expert value and a threshold intermediate range. Embodiments making further approximations include one or more of the extra linguistic ratio, paralinguistic ratio, and stylistic ratio in the ratio matrix with an appropriate weighting matrix and threshold value. Note, since words within the ASR result string will typically fall into several categories (e.g., "account" would be both content and task word, the various ratios for a given input sentence cannot simply be added with an expectation of producing 100% for the complete expert. The example below will illustrate).

Figure 5:
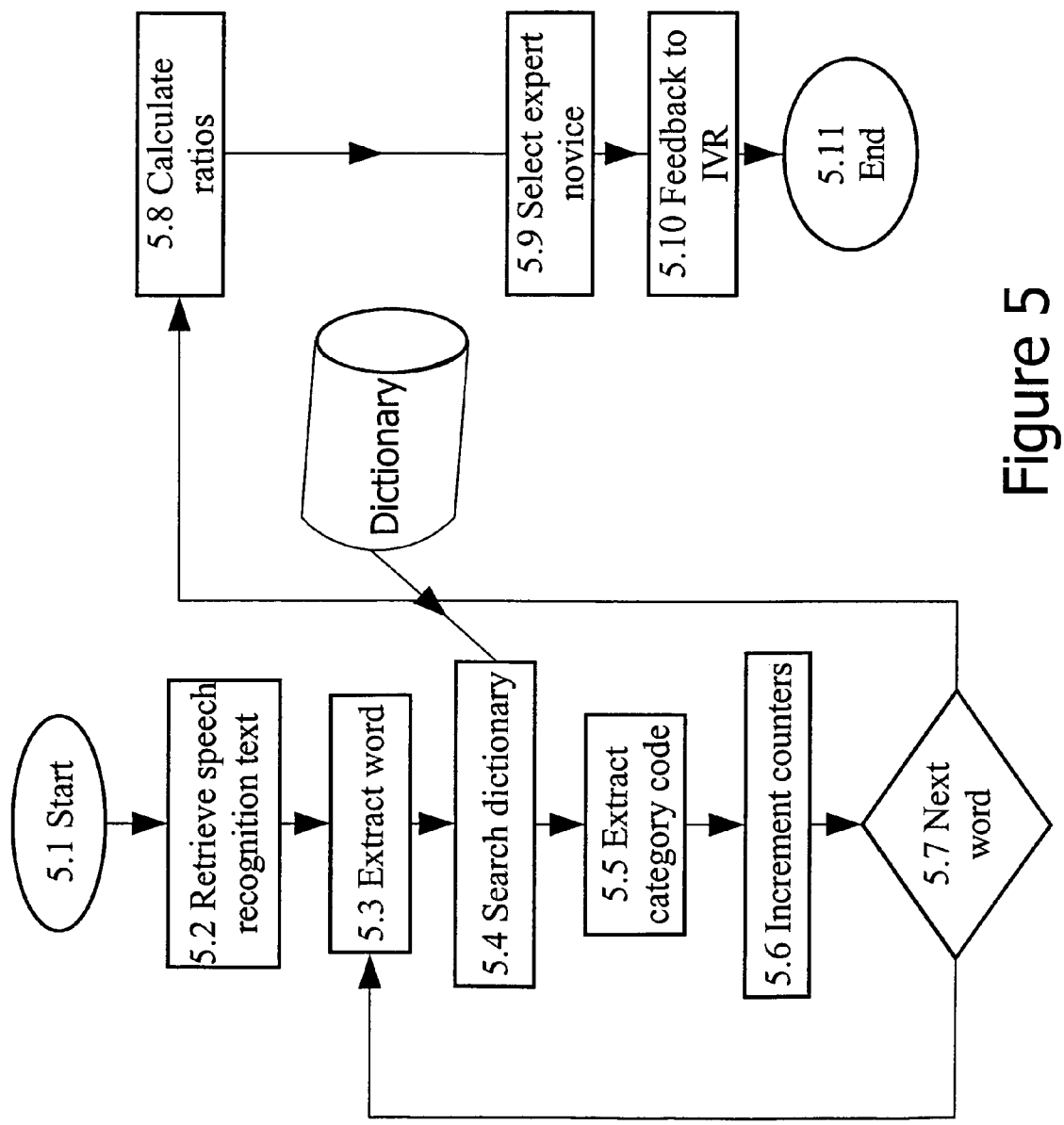
FIG. 5 is a method of a present embodiment.

The process steps of the lexical analyzer 50 are described with respect to FIG. 5. After dialing into an IVR 10, a caller 26 speaks a response which is recorded and processed by the ASR 16 to get a text string (start step 5.1). The text string is retrieved (step 5.2) by the lexical analyzer 50 and a first words or words are identified (step 5.3) by segmentation of the text string by identifying groups of the characters which are separated by spaces. A query is sent (step 5.4) to the dictionary 54 to locate the first word. A category code is extracted (step 5.5) from the dictionary 54 and returned to the lexical analyzer 50. The code is used by the counter engine 56 to increment (step 5.6) the word counters for the array of word types. The next word and subsequent words in the text string are dealt with in a similar manner (step 5.7) by looping back to the extract word step using the next and subsequent words and searching (step 5.4) the dictionary 54 as before. Once all the words have been queried using the database, the ratios are provided (step 5.8) by the ratio calculator 58 by dividing certain counts by corresponding counts. The decision logic takes input from the calculator 58 of the structure ratio, the particular service ratio corresponding to the IVR prompt, the extra linguistic ratio, the paralinguistic ratio, and the stylistic ratio to estimate a competence value and select (step 5.9) a competence level. The result is fed back to the IVR step 5.10 so that the next prompt can be personalized to the caller 26 before the process is ended (step 5.11).

Consider the following example, based on the words and word types of FIG. 6, in which a caller 26 wishes to find out the balance on their account. They may use the following constructs:

I. Erm . . . I'd like to check my account balance, please

The " . . . " (a noticeable pause) is discounted for simplicity. This construct then includes ten "words", as follows:

| | | | | |
|---|---|---|---|---|
| Extra linguistic | ERM | 1/10 | 10% | --> NOVICE |
| Function | I, would, to my | 4/10 | 40% | --> NOVICE/INTERM |
| Phatic | I, (woul)d, like, to, please | 5/10 | 50% | --> NOVICE |
| Content | like, check, account, balance | 4/10 | 40% | --> INTERMEDIATE |
| Task | account, balance | 2/10 | 20% | --> NOVICE |
| Task: Content | | | 50% | --> NOVICE/INTERM |

This gives 3 straight NOVICE decisions, 2 mixed NOVICE or INTERMEDIATE, and 1 INTERMEDIATE. The overall decision is NOVICE.

II. Give me my balance, please

| | | | | |
|---|---|---|---|---|
| Extra linguistic | — | 0/5 | 0% | --> INTERM/EXPERT |
| Function | me, my | 2/5 | 40% | --> NOVICE/INTERM |
| Phatic | please | 1/5 | 20% | --> INTERMEDIATE |
| Content | give, balance | 2/5 | 40% | --> INTERMEDIATE |
| Task | balance | 1/5 | 20% | --> NOVICE |
| Task:Content | | | 50% | --> NOVICE/INTERM |

This gives 1 NOVICE, 2 mixed NOVICE/INTERMEDIATE, 2 INTERMEDIATE, and 1 mixed EXPERT/INTERMEDIATE. The overall decision is INTERMEDIATE.

III. Balance inquiry: account number 1 2 3 4 5 6

| | | | | |
|---|---|---|---|---|
| Extra linguistic | — | | 0% | --> EXPERT |
| Function | — | | 0% | --> EXPERT |
| Phatic | — | | 0% | --> EXPERT |
| Content | <all> | 10/10 | 100% | --> EXPERT |
| Task | <all> | 10/10 | 100% | --> EXPERT |
| Task:Content | | | 100% | --> EXPERT |

This gives 6 EXPERT and an overall decision of EXPERT.

In this example, for construct III, the caller 26 has provided more than expected (i.e., provided both the indicator of the service ("balance enquiry") and the appropriate data (the account number)). It is clear that a further weighting could be applied for such "over efficiency" or explicit fastpath methodology. Further, no account is taken in these examples of word rate (i.e., how quickly and fluently the input is provided) which would allow further differentiation of the overall decision on the type of prompt that should be played to the caller 26. For example, the faster the rate of delivery in example II above, without compromising the ASR result (i.e., without introducing recognition failures), the more mixed NOVICE/INTERMEDIATE decisions would shift to INTERMEDIATE.

Another embodiment which does not use the lexical analyzer 50 calculates the overall word rate of the caller 26 by acquiring a response time from the IVR 10 and counting the words from the ASR 16.

A further alternative embodiment tracks the fundamental frequency of the response and counts the number of discontinuities over the period of time and checks for a final rise at the end of the signal. A preponderance of these factors indicates an uncertain voice and a novice caller 26.

Although this approach is directed to telephony it is not so restricted. Such a method could apply to any automated service, for instance, text dialogue in an Internet application.

Although the present invention and its advantages have been described in detail, it should be understood that various changes, substitutions and alterations can be made herein without departing from the spirit and scope of the invention as defined by the appended claims.

What is claimed is:

1. A method of managing dialogue in an interactive voice response system (IVR) comprising the steps of:
   receiving a voice signal from a caller to the IVR;
   converting the voice signal to text;
   estimating a caller type based on the number of words of a particular type within the text, wherein the caller type is based on the caller's level of competence for using the IVR system; and
   using the caller type to make a dialogue decision, wherein making the dialog decision comprises determining a type of automatic response to provide to the caller.

2. The method as in claim 1, wherein the using step further comprises the step of making the dialogue decision on which prompt to present next to the caller as a function of the estimated caller type.

3. The method as in claim 1, wherein one word type is made up of words relevant to the context of the dialogue.

4. The method as in claim 3, wherein another word type is made up of words relevant to the context of a task specific part of the dialogue.

5. A method of managing dialogue in an interactive voice response system (IVR) comprising the steps of:
   receiving a voice signal from a caller to the IVR;
   converting the voice signal to text;
   estimating a caller type based on the number of words of a particular type within the text, wherein the caller type is based on a word ratio; and
   using the caller type to make a dialogue decision.

6. A method of managing dialogue in an interactive voice response system (IVR) comprising the steps of:
   receiving a voice signal from a caller to the IVR;
   converting the voice signal to text;
   estimating a caller type based on the number of words of a particular type within the text;
   using the caller type to make a dialogue decision;
   locating a word type flag in a dictionary for each word in the text;
   incrementing a word type counter depending on the flag; and
   estimating the caller type using the word type counter.

7. The method as in claim 6, further comprising the steps of:
   identifying more than one word type from the word type flag; and
   incrementing more than one word type counter.

8. The method as in claim 7, further comprising the step of identifying from each bit of the word type flag whether a word is a certain type, each bit of the word type flag being associated with one word type.

9. A method of managing dialogue in an interactive voice response system (IVR) comprising the steps of:
   receiving a voice signal from a caller to the IVR;
   converting the voice signal to text;

estimating a caller type based on the number of words of a particular type within the text; and using the caller type to make a dialogue decision whether to use expert or novice prompts to the caller, wherein the using step further comprises the step of making the dialogue decision on which prompt to present next to the caller as a function of the estimated caller type, wherein the dialogue decision whether to use expert or novice prompts is made depending on whether the caller type is above or below a threshold value.

10. A method of managing dialogue in an interactive voice response system (IVR) comprising the steps of:

receiving a voice signal from a caller to the IVR;
converting the voice signal to text;
estimating a caller type based on the number of words of a particular type within the text; and
using the caller type to make a dialogue decision on which prompt to present next to the caller, wherein the using step further comprises the step of making the dialogue decision on which prompt to present next to the caller as a function of the estimated caller type, wherein a decision whether to use expert, intermediate, or novice prompts is made depending on whether the caller type falls below, inside or above a threshold range.

11. A method of managing dialogue in an interactive voice response system (IVR) comprising the steps of:

receiving a voice signal from a caller to the IVR;
converting the voice signal to text;
estimating a caller type based on the number of words of a particular type within the text, wherein one word type is made up of words relevant to the context of the dialogue, wherein a number of words per second spoken by the caller is used together with the context type to give a further approximation as to a competence of the caller; and
using the caller type to make a dialogue decision.

12. The method as in claim 11, wherein the context ratio and the number of words per second are weighted and combined to give an overall factor having a threshold value or range to decide the competence of the caller.

13. A system for managing dialogue in an interactive voice response system (IVR) comprising:

the IVR receiving a voice signal from a caller;
an automatic speech recognition system (ASR) converting the voice signal to text;
a lexical analyzer estimating a caller type based on the number of words of a particular type within the text wherein the caller type is based on the caller's level of competence for using the IVR system; and
a prompt generator using the caller type to make a dialogue decision wherein making the dialog decision comprises determining a type of automatic verbal response to provide to the caller.

14. The system as in claim 13, wherein the prompt generator makes the dialogue decision on which prompt to present next to the caller as a function of the estimated caller type.

15. The system as in claim 13, wherein one word type is made up of words relevant to the context of the dialogue.

16. The system as in claim 15, wherein another word type is made up of words relevant to the context of a task specific part of the dialogue.

17. A system for managing dialogue in an interactive voice response system (IVR) comprising:

the IVR receiving a voice signal from a caller;
an automatic speech recognition system (ASR) converting the voice signal to text;
a lexical analyzer estimating a caller type based on the number of words of a particular type within the text, wherein the caller type is based on a word ratio; and
a prompt generator using the caller type to make a dialogue decision.

18. A system for managing dialogue in an interactive voice response system (IVR) comprising:

the IVR receiving a voice signal from a caller;
an automatic speech recognition system (ASR) converting the voice signal to text;
a lexical analyzer estimating a caller type based on the number of words of a particular type within the text;
a prompt generator using the caller type to make a dialogue decision;
a search engine locating a word type flag in a dictionary for each word in the text;
account engine incrementing a word type counter depending on the flag; and
the lexical analyzer estimating the caller type using the word type counter.

19. The system as in claim 18, further comprising:
the search engine identifying more than one word type from the word type flag; and
the count engine incrementing more than one word type counter.

20. The system as in claim 19, further comprising the search engine identifying from each bit of the word type flag whether a word is a certain type, each bit of the word type flag being associated with one word type.

21. A system for managing dialogue in an interactive voice response system (IVR) comprising:

the IVR receiving a voice signal from a caller;
an automatic speech recognition system (ASR) converting the voice signal to text:
a lexical analyzer estimating a caller type based on the number of words of a particular type within the text; and
a prompt generator using the caller type to make a dialogue decision, wherein the prompt generator makes the dialogue decision on which prompt to present next to the caller as a function of estimated caller type, wherein the dialogue decision whether to use expert or novice prompts is made depending on whether the caller type is above or below a threshold value.

22. A system for managing dialogue in an interactive voice response system (IVR) comprising:

the IVR receiving a voice signal from a caller;
an automatic speech recognition system (ASR) converting the voice signal to text;
a lexical analyzer estimating a caller type based on the number of words of a particular type within the text, and
a prompt generator using the caller type to make a dialogue decision whether to use expert or novice prompts, wherein the prompt generator makes the dialogue decision on which prompt to present next to the caller as a function of the estimated caller type, wherein a decision whether to use expert, intermediate, or novice prompts is made depending on whether the caller type falls below, inside or above a threshold range.

23. A system for managing dialogue in an interactive voice response system (IVR) comprising:

the IVR receiving a voice signal from a caller;
an automatic speech recognition system (ASR) converting the voice signal to text;
a lexical analyzer estimating a caller type based on the number of words of a particular type within the text, wherein one word type is made up of words relevant to the context of the dialogue, wherein a number of words per second spoken by the caller is used together with the context type to give a further approximation as to a competence of the caller; and a prompt generator using the caller type to make a dialogue decision.

24. The system as in claim 23, wherein the context ratio and the number of words per second are weighted and combined to give an overall factor having a threshold value or range to decide the competence of the caller.

25. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text wherein the caller type is based on the caller's level of competence for using the IVR system; and
   using the caller type to make a dialogue decision wherein making the dialog decision comprises determining a type of automatic verbal response to provide to the caller.

26. The computer program product as in claim 25, wherein the using program step further comprises the program step of making the dialogue decision on which prompt to present next to the caller as a function of the estimated caller type.

27. The computer program product as in claim 25, wherein one word type is made up of words relevant to the context of the dialogue.

28. The computer program product as in claim 27, wherein another word type is made up of words relevant to the context of a task specific part of the dialogue.

29. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text, wherein the caller type is based on a word ratio; and
   using the caller type to make a dialogue decision.

30. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text;
   using the caller type to make a dialogue decision;
   locating a word type flag in a dictionary for each word in the text;
   incrementing a word type counter depending on the flag; and
   estimating the caller type using the word type counter.

31. The computer program product as in claim 30, further comprising the program steps of:
   identifying more than one word type from the word type flag; and
   incrementing more than one word type counter.

32. The computer program product as in claim 31, further comprising the program step of identifying from each bit of the word type flag whether a word is a certain type, each bit of the word type flag being associated with one word type.

33. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text; and
   using the caller type to make a dialogue decision whether to use expert or novice prompts, wherein the using program step further comprises the program step of making the dialogue decision on which prompt to present next to the caller as a function of the estimated caller type, wherein the dialogue decision whether to use expert or novice prompts is made depending on whether the caller type is above or below a threshold value.

34. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text; and
   using the caller type to make a dialogue decision on which prompt to present next to the caller, wherein the using program step further comprises the program step of making the dialogue decision on which prompt to present next to the caller as a function of the estimated caller type, wherein a decision whether to use expert, intermediate, or novice prompts is made depending on whether the caller type falls below, inside or above a threshold range.

35. A computer program product, stored on a computer-readable storage medium, for executing computer program instructions to carry out the steps of a method of managing dialogue in an interactive voice response system (IVR) comprising the program steps of:
   in response to receipt of a voice signal from a caller to the IVR, converting the voice signal to text;
   estimating a caller type based on the number of words of a particular type within the text, wherein one word type is made up of words relevant to the context of the dialogue, wherein a number of words per second spoken by the caller is used together with the context type to give a further approximation as to a competence of the caller;
   using the caller type to make a dialogue decision.

36. The computer program product as in claim 35, wherein the context ratio and the number of words per second are weighted and combined to give an overall factor having a threshold value or range to decide the competence of the caller.

* * * * *